(12) United States Patent
Chen

(10) Patent No.: US 7,717,678 B2
(45) Date of Patent: May 18, 2010

(54) SPINDLE WITH OVERMOLDED BUSHING

(75) Inventor: Liheng Chen, Elk Grove Village, IL (US)

(73) Assignee: Turning Point Propellers, Inc., Elk Grove Village, IL (US)

( * ) Notice: Subject to any disclaimer, the term of this patent is extended or adjusted under 35 U.S.C. 154(b) by 855 days.

(21) Appl. No.: 11/599,070

(22) Filed: Nov. 14, 2006

(65) Prior Publication Data

US 2008/0139061 A1    Jun. 12, 2008

(51) Int. Cl.
*B63H 1/04*    (2006.01)
(52) U.S. Cl. .................. 416/134 R; 416/2; 416/135; 416/170 R; 416/244 B
(58) Field of Classification Search ............ 416/2, 416/134 R, 135, 170 R, 204 R, 245 A
See application file for complete search history.

(56) References Cited

U.S. PATENT DOCUMENTS

| | | | |
|---|---|---|---|
| 1,906,057 A | 4/1933 | Guy | |
| 2,235,605 A | 3/1941 | Bugatti | |
| 2,469,116 A | 5/1949 | Kiekhaefer | |
| 2,471,982 A | 5/1949 | Shulda | |
| 2,556,151 A | 6/1951 | Bremer | |
| 2,956,187 A | 10/1960 | Wood | |
| 2,974,502 A | 3/1961 | Radcliff | |
| 3,002,365 A | 10/1961 | Liljeguist | |
| 3,045,763 A | 7/1962 | Perrott | |
| 3,563,670 A | 2/1971 | Knuth | |
| 3,701,611 A | 10/1972 | Lambrecht | |
| 3,764,228 A | 10/1973 | Shook | |
| 3,865,509 A | 2/1975 | Frazzell et al. | |
| 3,876,331 A | 4/1975 | DenHerder et al. | |
| 4,338,064 A | 7/1982 | Carmel | |
| 4,417,852 A | 11/1983 | Costabile et al. | |
| 4,452,591 A | 6/1984 | Fishaugh et al. | |
| 4,566,855 A | 1/1986 | Costabile et al. | |
| 4,642,057 A | 2/1987 | Frazzell et al. | |
| 4,778,419 A | 10/1988 | Bolle et al. | |
| 4,802,822 A | 2/1989 | Gilgenbach et al. | |
| 4,826,404 A | 5/1989 | Zwicky | |
| 4,842,483 A | 6/1989 | Geary | |
| 4,898,552 A | 2/1990 | Cochran | |
| 4,911,663 A | 3/1990 | Meier | |

(Continued)

FOREIGN PATENT DOCUMENTS

DE    1152132    9/1967

(Continued)

*Primary Examiner*—Ninh H Nguyen
*Assistant Examiner*—Aaron R Eastman
(74) *Attorney, Agent, or Firm*—Boyle Fredrickson, S.C.

(57) ABSTRACT

A propeller assembly is provided for mounting on a propeller shaft of a watercraft. The propeller assembly includes a housing structure having a plurality of blades projecting radially therefrom. A bushing assembly translates rotational movement of the propeller shaft to the housing structure. The bushing assembly includes a spindle having an inner surface that meshes with the outer surface of a propeller shaft and a resilient bushing molded over the spindle. A plurality of spaced, longitudinally extending keys extend along the outer surface of the spindle. In the event that the propeller blades become fixed during operation of the watercraft, the keys fragment from the outer surface of spindle so as to disengage the spindle from the housing structure. In such manner, damage to the engine and to the drive system of the marine vehicle may be avoided.

20 Claims, 4 Drawing Sheets

U.S. PATENT DOCUMENTS

| | | |
|---|---|---|
| 5,022,875 A | 6/1991 | Karls |
| 5,049,034 A | 9/1991 | Cahoon |
| 5,201,679 A | 4/1993 | Velte, Jr. et al. |
| 5,244,348 A | 9/1993 | Karls et al. |
| 5,252,028 A | 10/1993 | LoBosco et al. |
| 5,322,416 A | 6/1994 | Karls et al. |
| 5,484,264 A | 1/1996 | Karls et al. |
| 5,527,153 A | 6/1996 | Bernhardt |
| 5,810,561 A | 9/1998 | Cossette |
| 5,908,284 A | 6/1999 | Lin |
| 5,967,751 A | 10/1999 | Chen |
| 6,358,008 B1 | 3/2002 | Chen |
| 6,383,042 B1 | 5/2002 | Neisen |
| 6,471,481 B2 | 10/2002 | Chen |
| 6,478,543 B1 | 11/2002 | Tuchscherer et al. |
| 6,524,069 B2 | 2/2003 | Chen |
| 6,672,834 B2 * | 1/2004 | Chen ............................ 416/2 |

FOREIGN PATENT DOCUMENTS

| | | |
|---|---|---|
| GB | 201198 A | 8/1988 |
| RU | 0441009 | 8/1974 |

* cited by examiner

SPINDLE WITH OVERMOLDED BUSHING

FIELD OF THE INVENTION

This invention relates generally to propellers, and in particular, to a hub assembly for translating rotational movement from a propeller shaft of a marine vehicle to the blades of a propeller.

BACKGROUND AND SUMMARY OF THE INVENTION

It is known to propel a marine vehicle utilizing a propeller assembly mounted on a rotatable drive shaft. The propeller assembly includes a plurality of propeller blades extending radially from a central hub. A motor rotates the drive shaft that, in turn, rotates the propeller blades propelling the marine vehicle through the water. Typically, the propeller assembly is constructed as a unit wherein the propeller blades and the central hub are mounted or removed from the drive shaft in unison. Alternatively, in order to reduce the time and costs associated with replacing the propeller blades, it has been contemplated to provide a propeller assembly for a marine engine wherein the propeller blades project from a propeller housing that is removable from a central hub.

By way of example, Chen, U.S. Pat. No. 5,967,751 discloses a marine propeller assembly that includes a central hub secured to the propeller shaft and having three or more axially extending keys on the outer surface thereof. A propeller housing includes an inner surface having three or more pairs of lobes for forming keyways that receive the keys of the central hub. A retainer disc is threaded on a propeller shaft and includes a plurality of angularly spaced ears for engaging with the lobes on the inner surface on the propeller housing in order to prevent the propeller housing from being disengaged from the central hub.

While the advantages of a removable propeller housing are readily apparent, it can be appreciated that it is often highly desirable to retain the propeller assembly on the propeller shaft in such a manner as to prevent any unnecessary movement of the propeller assembly that may reduce the overall efficiency of the drive system of the marine vehicle. However, during such circumstances when the propeller blades engage a fixed object in the water such as a rock or the like, it is highly desirable to prevent the abrupt stoppage of the drive shaft of the marine vehicle in order to prevent damage to the drive system. In addition, it may be necessary to disengage the drive shaft of the marine vehicle from the propeller housing in order to prevent damage to the drive system.

Therefore, it is a primary object and feature of the present invention to provide a hub assembly for a propeller which permits limited continued rotation of the spindle and propeller shaft before disengaging the propeller shaft from the central hub and propeller assembly.

It is a further object and feature of the present invention to provide a propeller assembly that may be simply and easily mounted on and removed from the drive shaft of a marine vehicle.

It is a still further object and feature of the present invention to provide a hub assembly for a propeller which is simple and inexpensive to manufacture.

In accordance with the present invention, a propeller assembly is provided for mounting on a rotatable propeller shaft of a watercraft. A housing structure extends along a longitudinal axis and has an inner surface defining passageway therethrough. The inner surface includes a first portion being a first radial distance from the longitudinal axis and a second portion being a second radial distance from the longitudinal axis. A spindle is receivable in the passageway of the housing. The spindle has an inner surface defining a passageway for receiving the propeller shaft therethrough and an outer surface. A longitudinally extending key extends along the outer surface of the spindle. The key includes a radially outer surface being a third radial distance from the longitudinal axis. The third radial distance is greater than the first radial distance and less than the second radial distance.

A bushing is molded over the outer surface of the spindle. The bushing includes an outer surface engageable with an inner surface of the housing structure. The bushing is formed from a resilient material and has a generally square-shaped cross section and rounded corners. The key fragments from the outer surface of the spindle in response to a predetermined force thereon. The inner surface of the spindle includes a plurality of longitudinally extending splines.

The inner surface of the housing structure has a generally square-shaped cross section. The inner surface of the housing structure is defined by first and second spaced sidewalls. The first and second sidewalls are generally parallel to each other. The inner surface also includes third and fourth spaced sidewalls. The third and fourth sidewalls are generally parallel to each other and are generally perpendicular to the first and second spaced sidewalls. The inner surface of the housing structure is further defined by a first rounded corner interconnecting the first and third sidewalls; a second rounded corner interconnecting the third and second sidewalls; a third rounded corner interconnecting the second and fourth sidewalls; and a fourth rounded corner interconnecting the fourth and first sidewalls.

In accordance with a further aspect of the present invention, a propeller assembly is provided for mounting on a rotatable propeller shaft of a watercraft. The propeller assembly includes a housing structure extending along a longitudinal axis. The housing structure includes an outer surface and an inner surface defining a cavity having a polygonal-shaped cross-section defined by at least one corner and at least one sidewall. A bushing assembly is receivable in the cavity of the housing structure. The bushing assembly includes a spindle and a bushing. The spindle has an inner surface defining a passageway for receiving the propeller shaft therethrough and an outer surface having a longitudinally extending key extending therealong. The key extends radially from the outer surface of the spindle toward a first corner of the at least one corner of the inner surface of the housing structure. The bushing is molded over the spindle. The bushing has an outer surface engageable with the inner surface of the housing structure.

The bushing is formed from a resilient material. The inner surface of the spindle includes a plurality of longitudinally extending splines. The outer surface of the housing structure has a plurality of circumferentially spaced blades projecting therefrom. The inner surface of the housing structure has a generally square-shaped cross section. The at least one sidewall of the inner surface of the housing structure includes first, second, third and fourth sidewalls. The first and second sidewalls are generally parallel to each other. The third and fourth sidewalls are generally parallel to each other and are generally perpendicular to the first and second spaced sidewalls. The at least one corner of the inner surface of the housing structure includes a second corner interconnecting the third and second sidewalls; a third corner interconnecting the second and fourth sidewalls; and a fourth corner interconnecting the fourth and first sidewalls.

In accordance with a still further aspect of the present invention, a propeller assembly is provided for mounting on a rotatable propeller shaft of a watercraft. The propeller assembly includes a housing structure extending along a longitudinal axis. The housing structure includes an outer surface and an inner surface defining a cavity. The inner surface is defined by first, second, third and fourth sidewalls. The first and second sidewalls are generally parallel to each other. The third and fourth sidewalls are generally parallel to each other and are generally perpendicular to the first and second spaced sidewalls. A first rounded corner interconnects the first and third sidewalls. A second rounded corner interconnects the third and second sidewalls. A third rounded corner interconnects the second and fourth sidewalls. A fourth rounded corner interconnects the fourth and first sidewalls. The propeller assembly also includes a bushing assembly. The bushing assembly includes a spindle and a bushing. The spindle has an inner surface defining a passageway for receiving the propeller shaft therethrough and an outer surface having a plurality of circumferentially spaced, longitudinally extending keys extending therealong. Each key of the spindle is directed toward a corresponding corner of the inner surface of the housing structure. The bushing is molded over the spindle. The bushing has an outer surface engageable with the inner surface of the housing structure.

The bushing is formed from a resilient material and the inner surface of the spindle includes a plurality of longitudinally extending splines.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
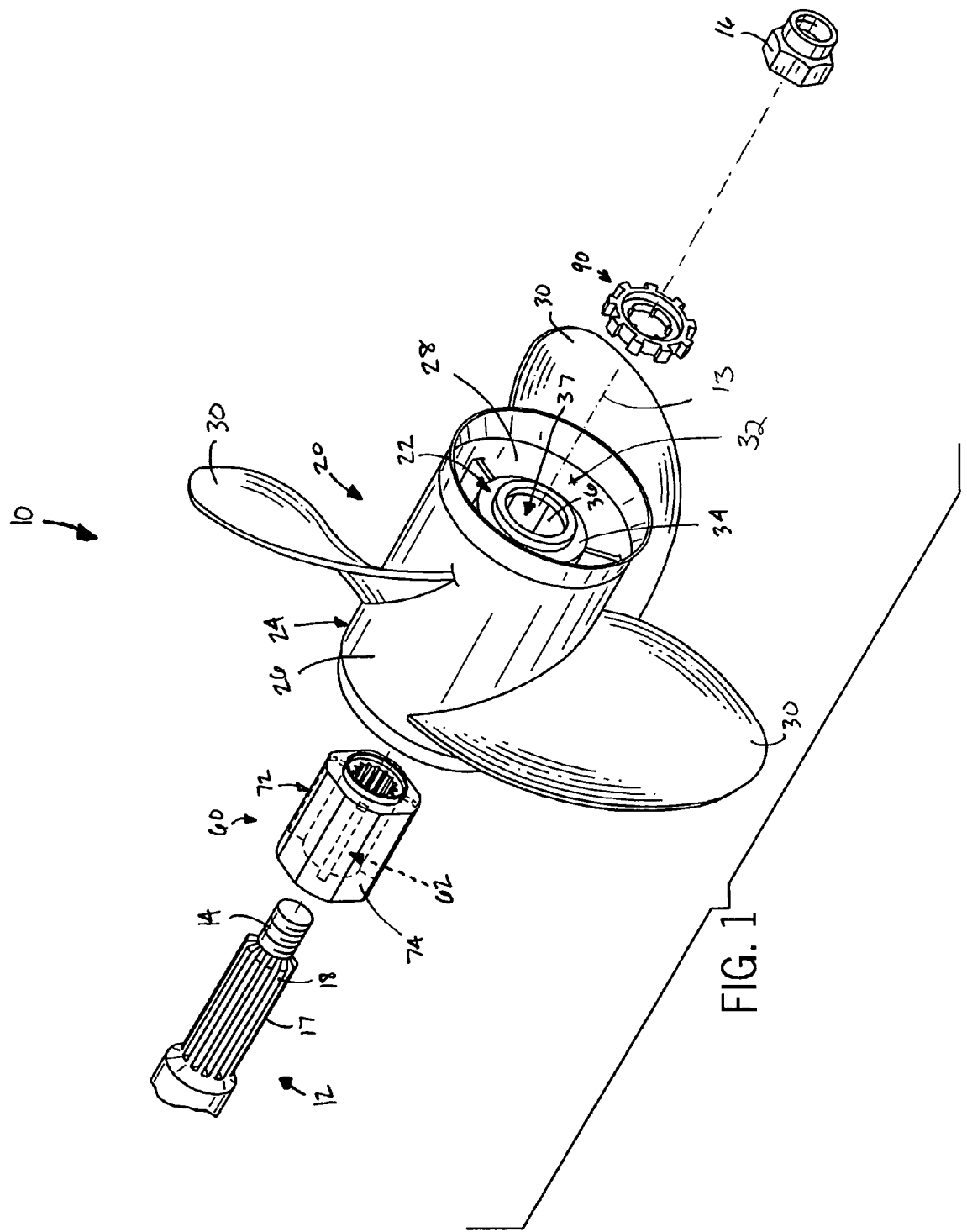
FIG. 1 is an exploded, isometric view of a propeller assembly in accordance with the present invention.

Referring to FIG. 1, a propeller assembly in accordance with the present invention is generally designated by the reference numeral 10. It is intended that propeller assembly 10 be mounted on a rotatable propeller shaft 12 which, in turn, is driven by a marine engine (not shown). Propeller shaft 12 extends along longitudinal axis 13 and terminates at a threaded terminal end 14 adapted for receiving a locking nut 16 thereon, for reasons hereinafter described. As is conventional, rotatable shaft 12 includes an outer surface 17 having longitudinally extending splines 18 therealong adjacent terminal end 14.

Figure 2:
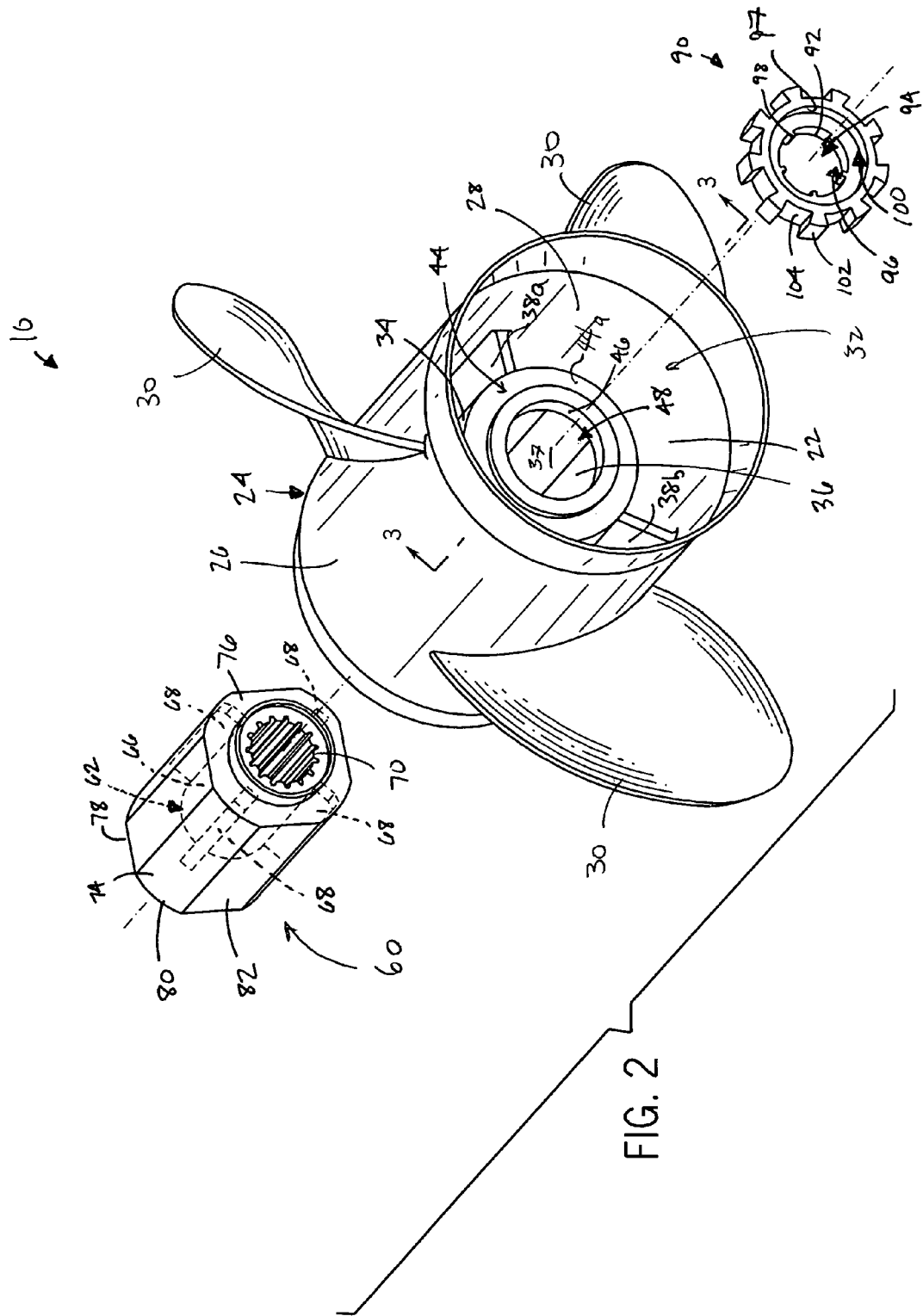
FIG. 2 is an enlarged, isometric view of the propeller assembly of FIG. 1.
Figure 3:
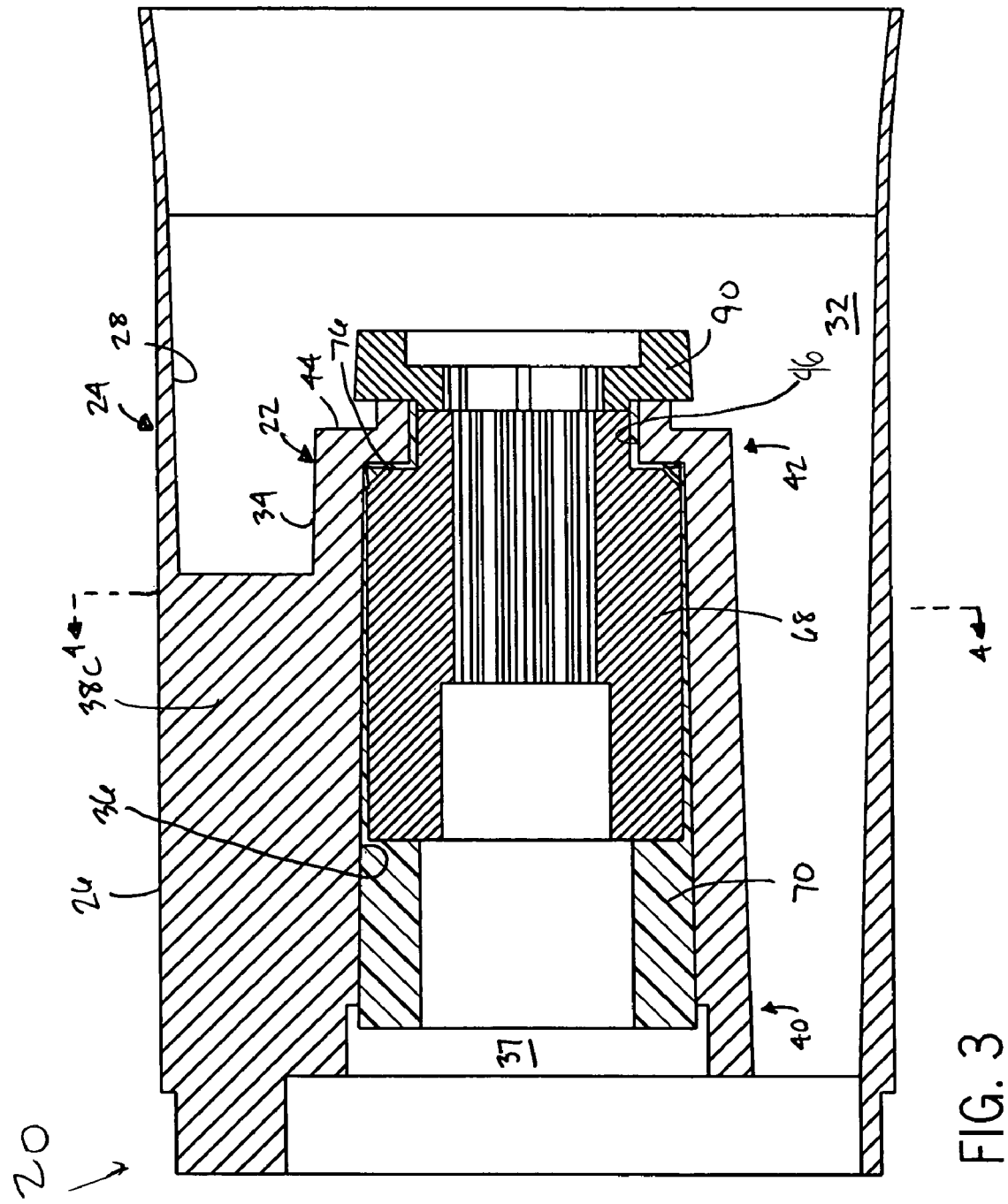
FIG. 3 is a cross-sectional view of the propeller assembly of the present invention taken along line 3-3 of FIG. 2.

Referring to FIGS. 1-3, propeller assembly 10 includes a central hub 20 having a generally cylindrical inner housing 22 and a generally cylindrical outer housing 24. Outer housing 24 has an outer surface 26 and an inner surface 28. A plurality of circumferentially spaced propeller blades 30 project radially from outer surface 26 of outer housing 24. Inner surface 28 defines an inner housing receipt cavity 32 for receiving inner housing 22 therein. Outer surface 34 of inner housing 22 and inner surface 28 of outer housing 24 are rigidly connected by a plurality of circumferentially spaced connection spokes 38a-38c extend therebetween. Spokes 38a-38c are circumferentially spaced about the outer surface 34 of inner housing 22.

Figure 4:
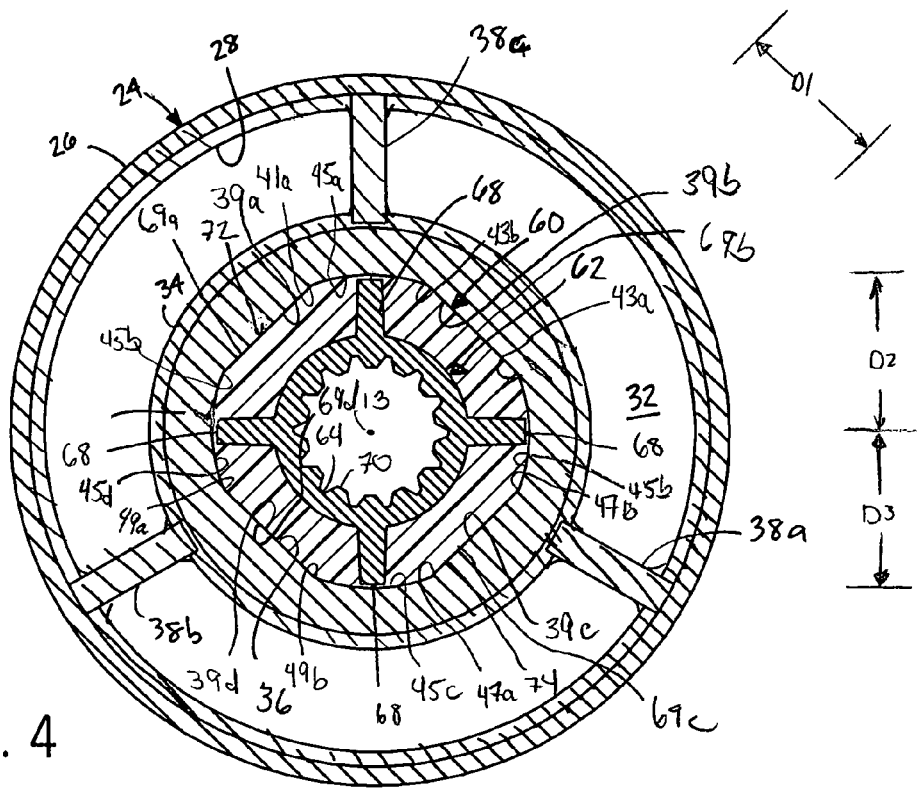
FIG. 4 is a cross-sectional view of the propeller assembly of the present invention taken along line 4-4 of FIG. 3 showing the propeller assembly during normal operating conditions.
Figure 5:
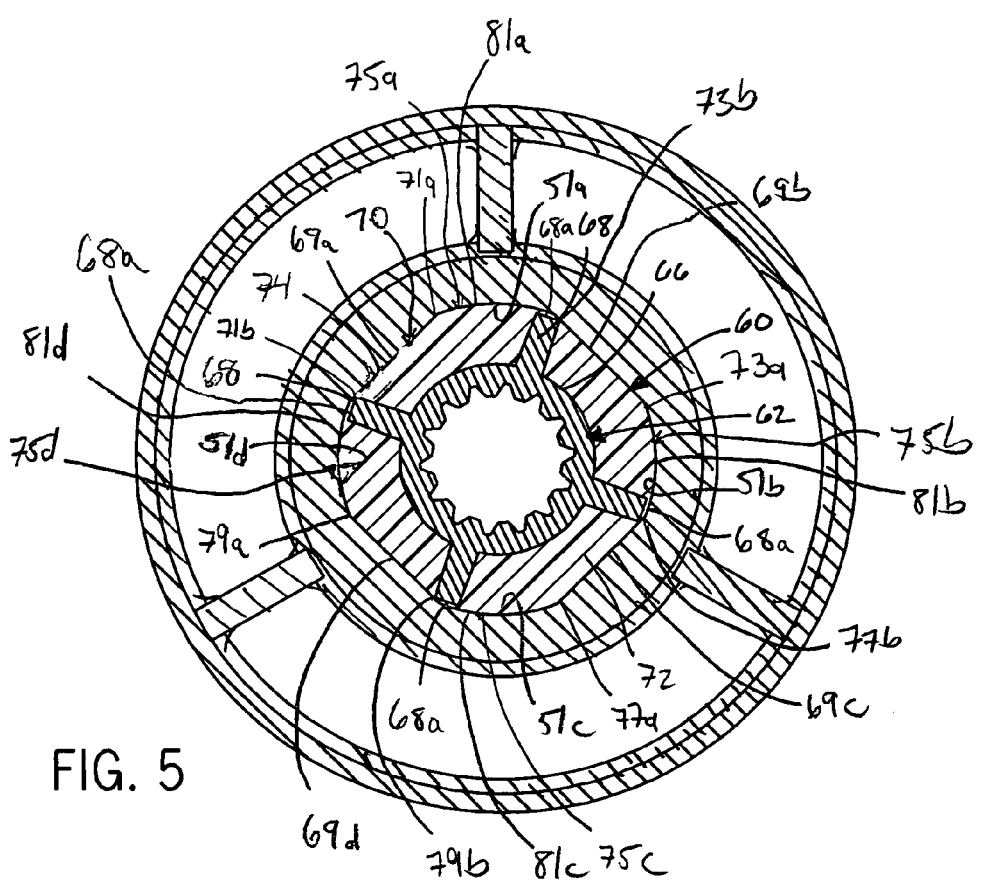
FIG. 5 is a cross-sectional view of the propeller assembly, similar to FIG. 4, showing the propeller assembly when the propeller housing has stopped rotating while the propeller shaft continues to rotate.

Inner housing 22 of central hub 20 includes inner surface 36 that defines inner cavity 37 for receiving bushing assembly 60, as hereinafter described. Inner housing 22 further includes first and second opposite ends 40 and 42, respectively. End flange 44 projects radially inward from second end 42 of inner housing 22 and terminates at a radially inner surface 46 which defines generally circular opening 48. As best seen in FIGS. 4-5, inner surface 36 of inner housing 22 is partially defined by first, second, third and fourth circumferentially spaced, longitudinally extending faces 39a-39d, respectively. First and third faces 39a and 39c, respectively, are generally parallel to and face each other. Similarly, second and fourth faces 39b and 39d, respectively, are generally parallel to and face each other. In addition, first and third faces 39a and 39c, respectively, are generally perpendicular to second and fourth faces 39b and 39d, respectively. Faces 39a-39d and longitudinal axis 13 are spaced by predetermined distances D1. It can be appreciated that as described, cavity 37 within inner housing 22 has a generally square cross-section. It is noted that while inner housing 22 has a generally square-shaped cross-section in the depicted embodiment, inner housing 22 may have other polygonal-shaped cross-sections without deviating from the scope of the present invention.

First side 41a of first face 39a is interconnect to second side 43b of second face 39b by a generally arcuate, longitudinally extending first corner 45a. First side 43a of second face 39b is interconnect to second side 47b of third face 39c by a generally arcuate, longitudinally extending second corner 45b. First side 47a of third face 39c is interconnect to second side 49b of fourth face 39d by a generally arcuate, longitudinally extending third corner 45c. First side 49a of fourth face 39d is interconnect to second side 41b of first face 39a by a generally arcuate, longitudinally extending fourth corner 45d. For reasons hereinafter described, it can be appreciated that the inner surfaces 51a-51d, of corners 45a-45d, respectively, are a predetermined distance D2 from longitudinal axis 13.

Propeller assembly 10 further includes bushing assembly 60 which is intended to translate rotation of propeller shaft 12 to central hub 20. Bushing assembly 60 includes spindle 62 having an inner surface 64 and a generally cylindrical outer surface 66. Inner surface 64 of spindle 62 includes a plurality of longitudinally extending splines 70 extending therealong which are intended to mesh with splines 18 extending along propeller shaft 12 when bushing assembly 60 is mounted thereon. A plurality of circumferentially spaced, longitudinally extending keys 68 project radially from outer surface 66 of spindle 62. Each key 68 terminates at a corresponding end surface 68a. End surfaces 68a of keys 68 are radially spaced from longitudinal axis 13 by a predetermined distance D3. For reasons hereafter described, distance D3 is greater than distance D1 and less than distance D3. It is contemplated for keys 68 to be frangible such that keys 68 disengage from outer surface 66 of spindle 62 in response to a predetermined force thereon.

Bushing assembly 60 further includes bushing 72 fabricated from any one of various resilient natural or synthetic materials which normally retain their molded shape, permit some flexing and distortion under shear, and resume their molded shape after the stress is removed. Bushing 72 includes outer surface 74 corresponds in shape to inner surface 36 of inner housing 22 of central hub 20. More specifically, outer surface 74 of bushing 72 is partially defined by is partially defined by first, second, third and fourth circumferentially spaced, longitudinally extending faces 69a-69d, respectively. First and third faces 69a and 69c, respectively, are generally parallel to and face each other. Similarly, second and fourth faces 69b and 69d, respectively, are generally parallel to and face each other. In addition, first and third faces 69a and 69c, respectively, are generally perpendicular to second and fourth faces 69b and 69d, respectively. Faces 69a-69d and longitudinal axis 13 are spaced by predetermined distances D1.

First side 71a of first face 69a is interconnect to second side 73b of second face 69b by a generally arcuate, longitudinally extending first corner 75a. First side 73a of second face 69b is interconnect to second side 77b of third face 69c by a generally arcuate, longitudinally extending second corner 75b. First side 77a of third face 69c is interconnect to second side 79b of fourth face 69d by a generally arcuate, longitudinally extending third corner 75c. First side 79a of fourth face 69d is interconnect to second side 71b of first face 69a by a generally arcuate, longitudinally extending fourth corner 75d. For reasons hereinafter described, it can be appreciated the outer surfaces 81a-81d, of corners 75a-75d, respectively, are a predetermined distance D2 from longitudinal axis 13. As described, bushing assembly 60 has a generally square-shaped cross section. As best seen in FIG. 4, bushing 72 is molded over the spindle 62 such that the keys 68 extend toward corresponding corners 75a-75d.

Referring back to FIGS. 1-3, in order to assemble a propeller assembly 10, bushing assembly 60 is inserted within inner cavity 37 of inner housing 22 such that outer surface 74 of bushing 72 engages inner surface 36 of inner housing 22 and such that first end 76 of bushing assembly 60 is positioned against end flange 44. More specifically, faces 69a-69d of bushing 72 engage corresponding faces 39a-39d of inner surface 36 of inner housing 22 and outer surfaces 81a-81d of corners 75a-75d, respectively, of bushing 72 engage corresponding inner surfaces 51a-51d of corners 45a-45d, respectively, of bushing 72.

In order to mount the propeller assembly 10 on propeller shaft 12, terminal end 14 of propeller shaft 12 is axially inserted through bushing assembly 60 such that splines 18 on outer surface 17 of propeller shaft 12 mesh with splines 70 along inner surface 64 of spindle 62 and such that terminal end 14 of propeller shaft 12 extends through the opening 48 defined by flange 44 of inner housing 22. Spider washer 90 is positioned on terminal end 14 of propeller shaft 12 adjacent outer surface 44a of flange 44 of inner housing. Spider washer 90 includes an inner surface 92 defining a passageway 94 therethrough. Longitudinally extending splines 98 extend along a first portion 96 of inner surface 92 of spider washer 90 and are adapted to mesh with splines 18 of propeller shaft 12. Inner surface 92 of spider washer 90 further includes a second portion 97 defining an enlarged portion 100 of passageway 94. Enlarged portion 100 of passageway 100 has is sufficient dimension to receive locking nut 16 threaded on terminal end 14 of propeller shaft 12 therein. It is contemplated for a plurality of circumferentially spaced tabs 102 to extend from outer surface 104 of spider washer 90. Tabs 102 are adapted for receiving a tab washer (not shown) which may be provided by selected OEM manufacturers of marine drive equipment in order to help maintain propeller assembly 10 on drive shaft 12.

As is conventional, meshed splines 18 and 70 of propeller shaft 12 and spindle 62, respectively, translate rotation of propeller shaft 12 to central hub 20 through bushing assembly 60. During operation of a marine vehicle in a body of water, rotation of propeller shaft 12 is translated to propeller assembly 10 such that propeller blades 30 propel the marine vehicle through the body of water. In the event that propeller blades 30 become fixed due to engagement with an object in the water, it can be appreciated that the engine of the marine vehicle will continue to attempt to rotate propeller shaft 12. As a result, rotational forces will be exerted on keys 68 projecting from outer surface 66 of spindle 62 by the propeller shaft 12. If the forces on keys 68 exceeds predetermined thresholds, keys 68 will compress bushing 72 and rotate. If propeller assembly 10 remains fixed by the object in the body of water, the rotational forces generated by propeller shaft 12 on bushing assembly 60 will urge keys 68 into engagement with corresponding second sides 41b, 43b, 47b and 49b of corresponding faces 39a-39d of inner surface 36 of inner housing 22 since end surfaces 68a of keys 68 are a greater radial distance D3 from longitudinal axis 13 than the distance D1 that faces 39a-39d are from longitudinal axis 13, FIG. 5. With keys 68 engaging corresponding second sides 41b, 43b, 47b and 49b of corresponding faces 39a-39d of inner surface 36 of inner housing 22, it is contemplated for keys 68 to fragment from outer surface 66 of spindle 62 in response to predetermined forces thereon. It can be appreciated that after keys 68 fragment from outer surface 66 of spindle 62, bushing assembly 60 is free to rotate within cavity 37 of inner housing 22. In such manner, it is intended to avoid damage to the engine and to the drive system of the marine vehicle.

It can also be appreciated that propeller assembly 10 may be assembled as heretofore described prior to the mounting thereof on propeller shaft 12. In such manner, bushing assembly 60 may be modified so as to adapt to various types of propeller shafts 12 produced by different manufacturers. In other words, utilizing a modified bushing assembly 60, propeller assembly 10 may be mounted on each of the various types of propeller shafts. Further, various modes of carrying out the invention are contemplated as being within the scope of the following claims particularly pointing out and distinctly claiming the subject matter which is regarded as the invention.

I claim:

1. A propeller assembly for mounting on a rotatable propeller shaft of a watercraft, comprising:
    a housing structure extending along a longitudinal axis and having an inner surface defining passageway therethrough, the inner surface including a first portion being a first radial distance from the longitudinal axis and a second portion being a second radial distance from the longitudinal axis;
    a spindle receivable in the passageway of the housing, the spindle having an inner surface defining a passageway for receiving the propeller shaft therethrough and an outer surface; and
    a longitudinally extending key extending along the outer surface of the spindle, the key including a radially outer surface being a third radial distance from the longitudinal axis;
    wherein the third radial distance is greater than the first radial distance and less than the second radial distance.

2. The propeller assembly of claim 1 further comprising a bushing molded over the outer surface of the spindle, the bushing including an outer surface engageable with an inner surface of the housing structure.

3. The propeller assembly of claim 2 wherein the bushing is formed from a resilient material.

4. The propeller assembly of claim 3 wherein the bushing has a generally square-shaped cross section and rounded corners.

5. The propeller assembly of claim 1 wherein the inner surface of the spindle includes a plurality of longitudinally extending splines.

6. The propeller assembly of claim 1 wherein the inner surface of the housing structure has a generally square-shaped cross section.

7. The propeller assembly of claim 1 wherein inner surface of the housing structure is defined by:
   first and second spaced sidewalls, the first and second sidewalls being generally parallel to each other; and
   third and fourth spaced sidewalls, the third and fourth sidewalls being generally parallel to each other and being generally perpendicular to the first and second spaced sidewalls.

8. The propeller assembly of claim 7 wherein the inner surface of the housing structure is further defined by:
   a first rounded corner interconnecting the first and third sidewalls;
   a second rounded corner interconnecting the third and second sidewalls;
   a third rounded corner interconnecting the second and fourth sidewalls; and
   a fourth rounded corner interconnecting the fourth and first sidewalls.

9. The propeller assembly of claim 1 wherein the key fragments from the outer surface of the spindle in response to a predetermined force thereon.

10. The propeller assembly of claim 1 wherein the key fragments from the outer surface of the spindle in response to a predetermined force thereon.

11. A propeller assembly for mounting on a rotatable propeller shaft of a watercraft, comprising:
    a housing structure extending along a longitudinal axis, the housing structure including an outer surface and an inner surface defining a cavity having a polygonal-shaped cross-section defined by at least one corner and at least one sidewall, the inner surface including a first portion being a first radial distance from the longitudinal axis and a second portion being a second radial distance from the longitudinal axis; and
    a bushing assembly receivable in the cavity of the housing structure, the bushing assembly including:
       a spindle having an inner surface defining a passageway for receiving the propeller shaft therethrough and an outer surface having a longitudinally extending key extending therealong, the key extending radially from the outer surface of the spindle toward a first corner of the at least one corner of the inner surface of the housing structure wherein the key comprises a radially outer surface being a third radial distance from the longitudinal axis;
       wherein the third radial distance is greater than the first radial distance and less than the second radial distance; and
       a bushing molded over the spindle, the bushing having an outer surface engageable with the inner surface of the housing structure.

12. The propeller assembly of claim 11 wherein the bushing is formed from a resilient material.

13. The propeller assembly of claim 11 wherein the inner surface of the spindle includes a plurality of longitudinally extending splines.

14. The propeller assembly of claim 11 wherein the outer surface of the housing structure has a plurality of circumferentially spaced blades projecting therefrom.

15. The propeller assembly of claim 11 wherein the inner surface of the housing structure has a generally square-shaped cross section.

16. The propeller assembly of claim 15 wherein the at least one sidewall of the inner surface of the housing structure includes:
    first and second spaced sidewalls, the first and second sidewalls being generally parallel to each other; and
    third and fourth spaced sidewalls, the third and fourth sidewalls being generally parallel to each other and being generally perpendicular to the first and second spaced sidewalls.

17. The propeller assembly of claim 16 wherein the at least one corner of the inner surface of the housing structure includes:
    a second corner interconnecting the third and second sidewalls;
    a third corner interconnecting the second and fourth sidewalls; and
    a fourth corner interconnecting the fourth and first sidewalls.

18. A propeller assembly for mounting on a rotatable propeller shaft of a watercraft, comprising:
    a housing structure extending along a longitudinal axis, the housing structure including an outer surface and an inner surface defining a cavity, the inner surface including a first portion being a first radial distance from the longitudinal axis and a second portion being a second radial distance from the longitudinal axis and defined by:
       first and second spaced sidewalls, the first and second sidewalls being generally parallel to each other;
       third and fourth spaced sidewalls, the third and fourth sidewalls being generally parallel to each other and being generally perpendicular to the first and second spaced sidewalls;
       a first rounded corner interconnecting the first and third sidewalls;
       a second rounded corner interconnecting the third and second sidewalls;
       a third rounded corner interconnecting the second and fourth sidewalls; and
       a fourth rounded corner interconnecting the fourth and first sidewalls;
    a bushing assembly including:
       a spindle having an inner surface defining a passageway for receiving the propeller shaft therethrough and an outer surface having a plurality of circumferentially spaced, longitudinally extending keys extending therealong, each key of the spindle being directed toward a corresponding corner of the inner surface of the housing structure wherein said keys each comprise a radially outer surface being a third radial distance from the longitudinal axis:
       wherein the third radial distance is greater than the first radial distance and less than the second radial distance; and
       a bushing molded over the spindle, the bushing having an outer surface engageable with the inner surface of the housing structure.

19. The propeller assembly of claim 18 wherein the bushing is formed from a resilient material.

20. The propeller assembly of claim 18 wherein the inner surface of the spindle includes a plurality of longitudinally extending splines.

* * * * *